United States Patent
Hodge

(10) Patent No.: US 10,038,727 B1
(45) Date of Patent: Jul. 31, 2018

(54) CONTROLLED ENVIRONMENT COMMUNICATION SYSTEM

(71) Applicant: **GLOBAL TEL*LINK CORPORATION**, Reston, VA (US)

(72) Inventor: Stephen Lee Hodge, Aubrey, TX (US)

(73) Assignee: **GLOBAL TEL*LINK CORPORATION**, Reston, VA (US)

(*) Notice: Subject to any disclaimer, the term of this patent is extended or adjusted under 35 U.S.C. 154(b) by 0 days.

(21) Appl. No.: 15/792,364

(22) Filed: Oct. 24, 2017

(51) Int. Cl.
| | | |
|---|---|---|
| H04L 29/06 | (2006.01) | |
| G06F 17/30 | (2006.01) | |
| G06F 21/62 | (2013.01) | |

(52) U.S. Cl.
CPC ...... *H04L 63/306* (2013.01); *G06F 17/30867* (2013.01); *G06F 21/62* (2013.01); *H04L 63/0421* (2013.01)

(58) Field of Classification Search
CPC ............ H04L 63/306; H04L 63/0421; G06F 17/30867; G06F 21/62
See application file for complete search history.

(56) References Cited

U.S. PATENT DOCUMENTS

| | | | |
|---|---|---|---|
| 8,832,374 B1* | 9/2014 | Schaefers | H04L 67/1097 711/115 |
| 9,674,198 B1* | 6/2017 | Hodge | H04L 63/101 |
| 2015/0188925 A1* | 7/2015 | Gupta | H04L 63/101 726/4 |
| 2017/0353404 A1 | 12/2017 | Hodge | |

* cited by examiner

*Primary Examiner* — Oleg Korsak
(74) *Attorney, Agent, or Firm* — Sterne, Kessler, Goldstein and Fox P.L.L.C.

(57) ABSTRACT

Methods and systems for providing a communication system in a controlled environment are disclosed herein. A communication server establishes a communication session between client devices located within a controlled environment, and routes communication data between the client devices via the communication session. In some embodiments, the communication server stores the communication data as confidential communications based on profile information corresponding to the clients associated with the client devices. Further, the communication server manages access to the confidential communications based on profile information associated with the clients, and the subject matter of the confidential communications.

17 Claims, 10 Drawing Sheets

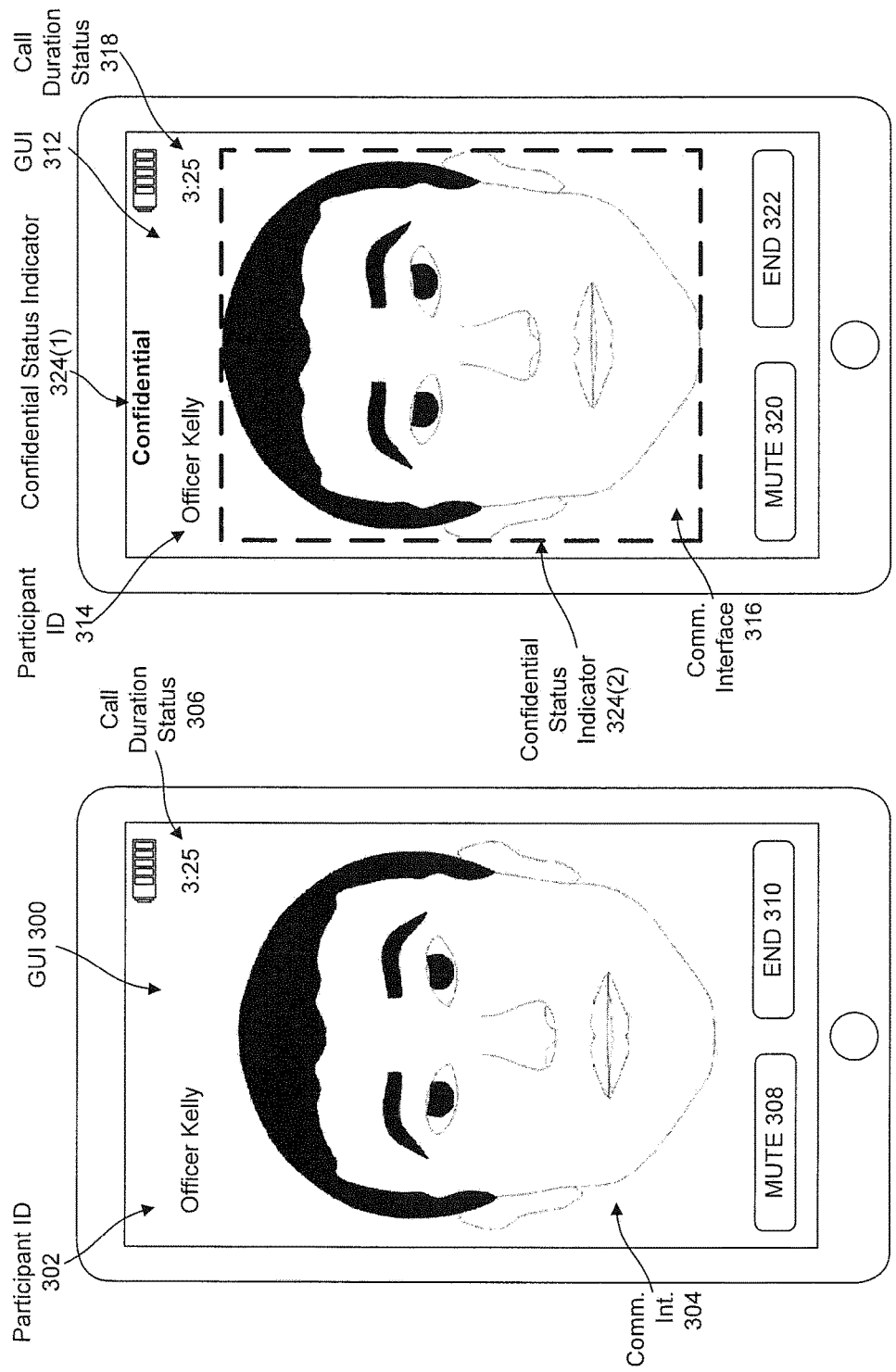

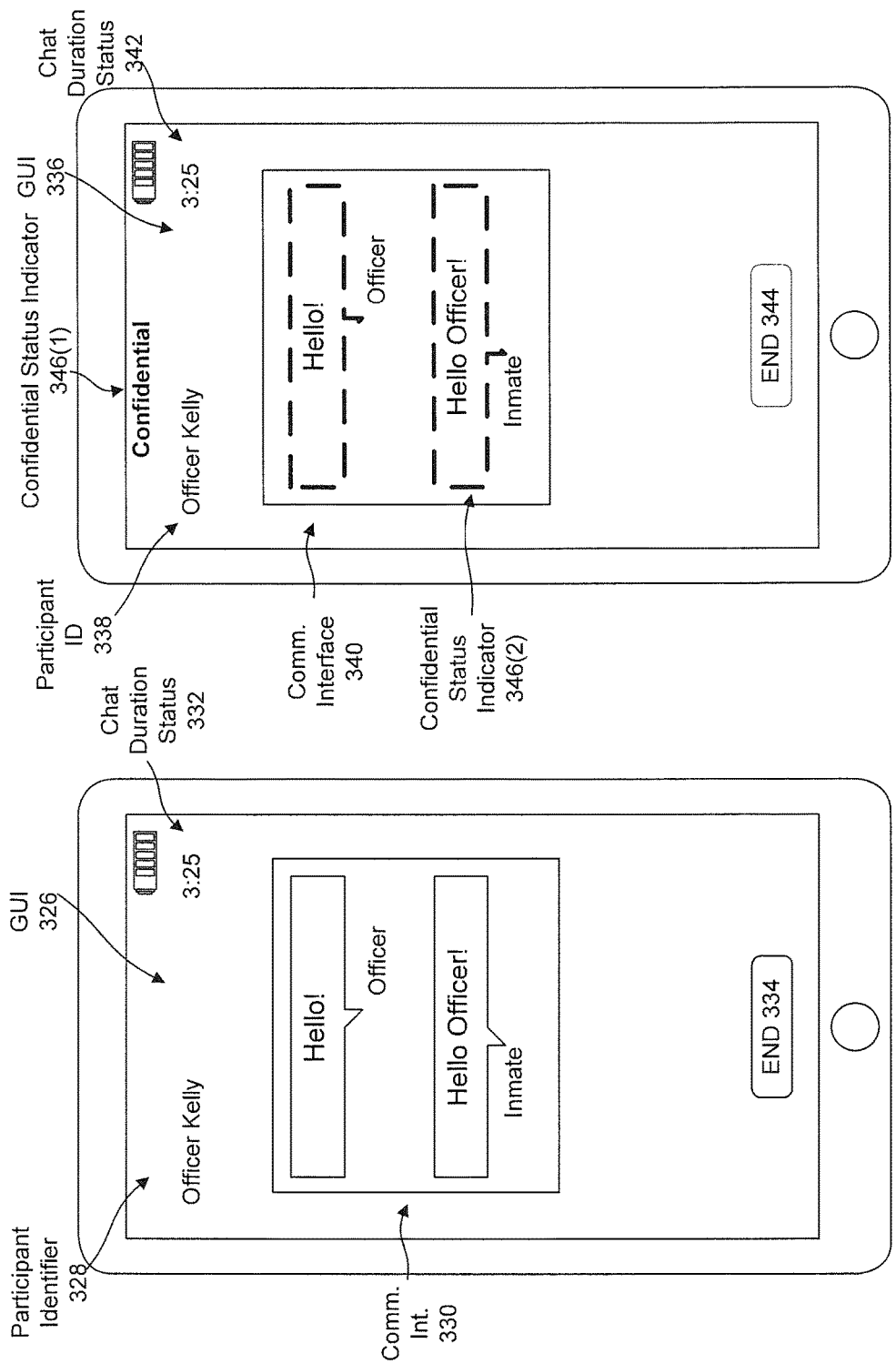

CONTROLLED ENVIRONMENT COMMUNICATION SYSTEM

FIELD OF THE INVENTION

This disclosure relates to a controlled environment communication system.

BACKGROUND OF THE INVENTION

American prison institutions house millions of individuals in controlled environments all over the country. Many modern prison institutions employ archaic means to facilitate communication between inmates and prison staff. For example, many prison still require inmates to prepare and submit written forms in order to communicate with administration. Further, many controlled environments fail to provide safe and confidential means for inmates to communicate with staff members about misconduct by other inmates and staff members within the controlled environment.

BRIEF DESCRIPTION OF THE DRAWINGS/FIGURES

A further understanding of the invention can be obtained by reference to a preferred embodiment set forth in the illustrations of the accompanying drawings. Although the illustrated embodiment is merely exemplary of systems for carrying out the invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the invention, reference is now made to the following drawings in which:

FIGS. 3A-3E illustrates example graphical user interfaces for providing communication system in a controlled environment, according to exemplary embodiments.

DETAILED DESCRIPTION OF THE INVENTION

As required, a detailed illustrative embodiment of the invention is disclosed herein. However, techniques, systems and operating structures in accordance with the invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the invention. The following presents a detailed description of the preferred embodiment of the invention.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or customize for various applications such exemplary embodiments, without undue experimentation, without departing from the spirit and scope of the disclosure. Therefore, such modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Figure 1:
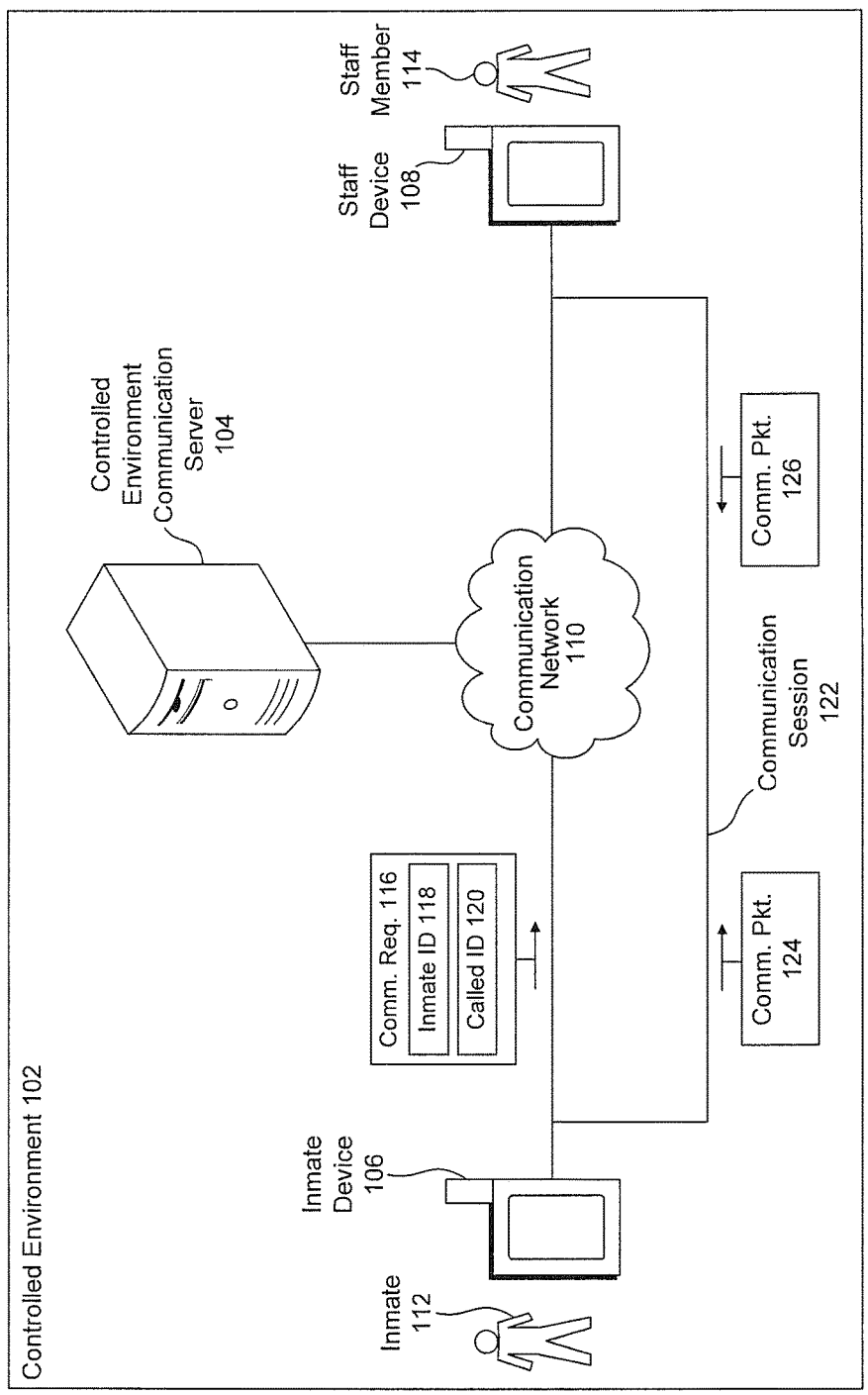
FIG. 1 illustrates a block diagram of an example framework for providing a communication system in a controlled environment, according to exemplary embodiments.

FIG. 1 illustrates a block diagram of an example framework for providing a communication system 100 in a controlled environment 102 (e.g., correctional facility, detention center, hospital, dormitory, mental health institution, etc.), according to an exemplary embodiment. In some embodiments, the controlled environment 102 is arranged into areas, stations, or regions associated with various functions (e.g., cell block, dining hall, commissary, library, exercise yard, hallway(s), etc.). FIG. 1 shows interactions between a controlled environment communication server 104, an inmate device 106, and a staff device 108 via a communication network(s) 110.

The communication network 110 may include any or all of a private network, personal area network (PAN), Local-Area Network (LAN), a Wide-Area Network (WAN), or the Internet. Further, the connection between any of the controlled environment communication server 104, the inmate device 106, or the staff device 108, and the communication network(s) 110 may be a wireless connection (e.g., Bluetooth™, Wi-Fi connection, etc.), or a wired connection (e.g., Ethernet, universal serial bus (USB), etc.).

As illustrated in FIG. 1, the inmate device 106 is associated with an inmate 112. Further, the inmate 112 may be confined to the controlled environment 102. For example, the inmate 112 may be imprisoned within the controlled environment 102 in accordance with a prison sentence. In some embodiments, the inmate device 106 is provided to the inmate 112 for entertainment, monitoring, and/or medical purposes within the controlled environment 102. Additionally, the staff device 108 is associated with a staff member 114 employed at the controlled environment 102. Some examples of the staff member 114 may include correctional officers, investigative officers, medical practitioners, custodial staff, administrative staff, contractors, etc. In some instances, the staff member 114 may be responsible for monitoring the safety and/or well-being of the inmate 112.

Some examples of the inmate device 106 and/or staff device 108, include smart phones and mobile communication devices, tablet computing devices, desktops, laptops, netbooks and other portable computers, wearable computing devices, and any other computing device capable of sending communications to the controlled environment communication server 104.

The controlled environment communication server 104 provides a communication system for authorized devices (e.g., the inmate device 106 and the staff device 108) within the controlled environment 102. Referring to FIG. 1, the inmate 112 may endeavor to communicate with the staff member 114 as a result of misconduct within the controlled environment 102. As shown in FIG. 1, the inmate device 106 sends a communication request 116 to the controlled environment communication server 104 via the communication network(s) 110. Further, the communication request 116 includes a client identifier 118 corresponding to the inmate 112, and a called party identifier 120 corresponding to the staff member 114.

Upon receipt of the communication request 116, the controlled environment communication server 104 determines whether the inmate 112 and the staff member 114 are permitted to communicate with each other via the communication system 100. If the inmate 112 and the staff member 114 are permitted to communicate with each other via the communication system 100, the controlled environment communication server 104 establishes a communication session 122 between the inmate device 106 and the staff device 108. In some embodiments, the communication session 122 is established over the communication network(s) 110. In some other embodiments, the communication session 122 is established over a network other than the communication network(s) 110.

Once the communication session 122 is established, the inmate 112 and the staff member 114 may communicate via the communication session 122. As shown in FIG. 1, the inmate device 106 sends communication data 124 to the staff device 108 via the communication session 122, and the staff device 108 sends communication data 126 to the inmate device 106 via the communication session 122. The communication session 122 includes at least one of a video call, audio call (e.g., internet based telephony, cellular based communication, etc.), or text based communication (e.g., short message service, instant messaging, multimedia messaging service, enhanced message service).

In some embodiments, the controlled environment communication server 104 stores the communication data 124 and the communication data 126 for monitoring purposes. Further, the controlled environment communication server 104 may store the communication data 124 and the communication data 126 as confidential communications. If the controlled environment communication server 104 stores the communication data 124 and the communication data 126 as confidential communications, the controlled environment communication server 104 restricts access to the communication data 124 and the communication data 126 to authorized parties. For example, if the communication data 124 and the communication data 126 are stored as confidential communications, only staff members having investigative and/or administrative duties may be able to access the communication data 124 and the communication data 126. In some examples, the controlled environment communication server 104 stores the communication data 124 and the communication data 126 as confidential communications based at least in part on the inmate 112, the staff member 114, and/or the subject matter of the communication data 124 and the communication data 126.

Confidential communications, as referred to herein, include audio, visual, and/or textual conversations between two or more clients of the communication system 100 that pertain to potential misconduct, misconduct, and/or gross neglect within the controlled environment 102. For example, confidential communications may include communications pertaining to excessive force by staff members against inmates. As another example, confidential communications may also include communications pertaining to possession of contraband by inmates within the controlled environment 102. As yet still another example, confidential communication may also include communications pertaining to sexual misconduct between inmates and/or staff members within the controlled environment 102.

Figure 2:
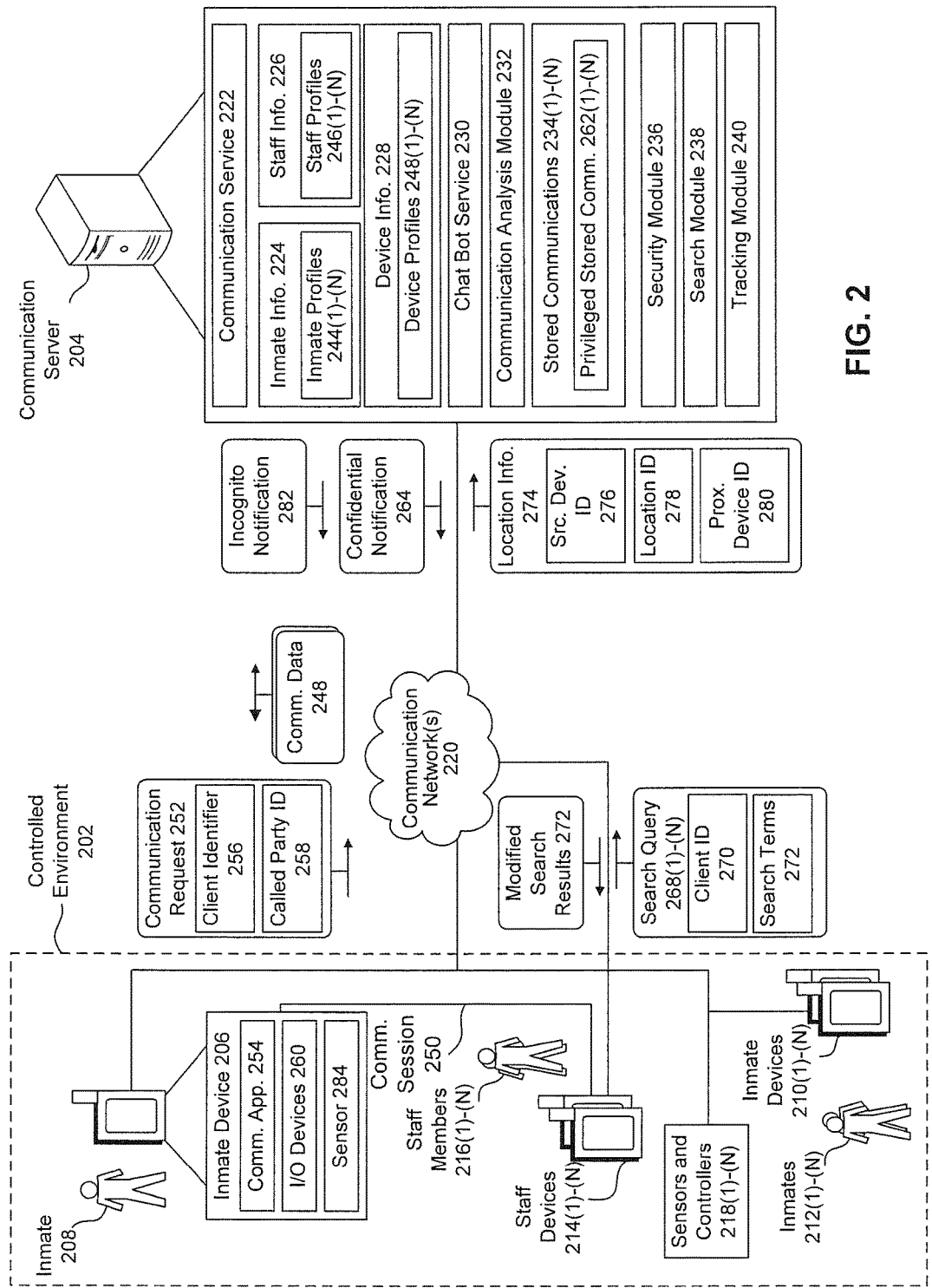
FIG. 2 illustrates a block diagram of an example framework for providing a communication system in a controlled environment, according to exemplary embodiments.

FIG. 2 illustrates a block diagram of an example framework for providing a communication system 200 in a controlled environment 202, according to an exemplary embodiment. FIG. 2 shows illustrative interactions within the controlled environment 202 between a communication server 204, an inmate device 206 (e.g., inmate device 106) associated with an inmate 208, inmate devices 210(1)-(N) (e.g., inmate device 106) associated with inmates 212(1)-(N), staff devices 214(1)-(N) (e.g., staff device 108) associated with staff members 216(1)-(N), and sensors and controllers 218(1)-(N). As illustrated in FIG. 2, the communication server 204, the inmate device 206, the inmate devices 210, the staff devices 214(1)-(N), and the sensors and controllers 218(1)-(N) communicate via a communication network(s) 220.

The controlled environment 202 is arranged into areas, stations, or regions associated with various functions. For instance, the controlled environment 202 may be physically and/or logically organized to include a staff member station, one or more cell blocks, a dining hall, commissary, library, exercise yard, hallway(s), etc. Further, the inmate 208 and the inmates 212 may be confined to the controlled environment 202. Additionally, the staff members 216 may be employed at the controlled environment 202. Some examples of the staff members 216 may include correctional officers, medical staff, custodial staff, administrative staff, contractors, etc. In addition, the staff members 216 may be responsible for monitoring the safety and/or well-being of the inmate 208 and the inmates 212.

Further, the sensors and controllers 218 are placed throughout the controlled environment 202 for monitoring and administrative purposes. Some examples of the sensors and controllers 218 include surveillance cameras, thermostats, network access points, location beacons, door controllers, lighting controllers, sprinkler system controllers, etc. In some embodiments, the sensors and controllers 218 are configured to detect the inmate device 206, the inmate devices 210, and/or the staff devices 214 within a predetermined distance of the sensors and controllers 218. For example, the sensors and controllers 218 read scannable indicia (e.g., RFID, barcode, etc.) of the inmate device 206, inmate devices 210, and the staff devices 214. As another example, the sensors and controllers 218 communicate with the inmate device 206, inmate devices 210, and the staff devices 214 via the communication network(s) 220.

In some embodiments, the individual inmates 212 are associated with particular inmate devices 210. For example, a first inmate 212(1) is associated with a first inmate device 210(1), an Nth inmate 212(N) is associated with an Nth inmate device 210(N), and so forth. Further, individual staff members 216 are associated with particular staff devices 214. For example, a first staff member 216(1) is associated with a first staff device 214(1), an Nth staff member 216(N) is associated with an Nth staff device 214(N), and so forth.

The communication network(s) 220 may include any or all of a private network, personal area network (PAN), Local-Area Network (LAN), a Wide-Area Network (WAN), or the Internet. Further, the connection between any of the communication server 204, the inmate device 206, the inmate devices 210, the staff devices 214, or the sensors and controllers 218, and the communication network(s) 220 may be a wireless connection (e.g., Bluetooth™, Wi-Fi connection, etc.), or a wired connection (e.g., Ethernet, universal serial bus (USB), etc.).

As shown in FIG. 2, the communication server 204 includes a communication service 222, inmate information 224, staff member information 226, device information 228, a chatbot service 230, a communication analysis module 232, stored communications 234(1)-(N), a security module 236, a search module 238, and a tracking module 240.

The inmate information 224 includes information about the inmate 208 and the inmates 212 confined to the controlled environment 202. As illustrated in FIG. 2, the inmate information 224 includes inmate profiles 242 corresponding to the inmate 208 and the inmates 212. For example, the first inmate profile 242 (1) is associated with the inmate 208. In some instances, the inmate profiles 242 include information from one or more of a jail management system (JMS), an offender management system (OMS), a public database containing information on prison inmates, or booking information. Further, the inmate profiles 242 include historical location information, previous residences or correctional facilities, gang affiliations, family members, persons (e.g., victims, co-defendants, or witnesses) associated with legal proceedings involving an inmate, languages and/or dialects spoken by an inmate, device usage history, historic communication history, biometric information associated with an inmate, speech recognition information associated with the inmate, encryption information, authentication information, authorization information, incident reports, visitor logs, etc.

The staff member information 226 includes information about the staff members 216 associated with the controlled environment 202. As illustrated in FIG. 2, the staff member information 226 includes staff member profiles 244 corresponding to the staff members 216. For example, a first staff member profile 244(1) is associated with a first staff member 216(1), an Nth staff member profile 244(N) is associated with an Nth staff member 216(N), and so forth. In certain embodiments, the staff member profiles 244 include authentication information, encryption information, authorization information, biographical information, staff device information, contact information, employment information, employee role, job title information, communication history, incident information, complaint history, etc. For example, the first staff member profile 244(1) may indicate that the first staff member 216(1) has an investigative role within the controlled environment 202. As another example, the first staff member profile 244(1) may indicate that the first staff member 216(1) has an administrative role within the controlled environment 202.

The device information 228 includes device profiles 246 corresponding to the inmate device 206, the inmate devices 210, and the staff devices 214. For example, a first device profile 246(1) is associated with the inmate device 206. In some instances, the device profiles 246 include a device name, a device manufacturer, firmware identifier, operating system identifier, upgrade history, device capabilities, installed applications, and/or device usage history. Further, in some instances, the device profile 246(1) identifies that the inmate 208 is currently in possession of the inmate device 206, and/or the current location of the inmate device 206.

The chatbot service 230 is a computer program component configured to communicate with the inmate 208, the inmates 212, and the staff members 216. Some examples of the chatbot service 230 include conversational agents, dialog systems, conversational programs, etc. An example of a chatbot system is disclosed in U.S. patent application Ser. No. 15/174,231 by Hodge, entitled "Personalized Chatbots for Inmates," filed on Jun. 6, 2016, the entire contents of which are incorporated herein by reference. In some embodiments, the chatbot service 230 is configured to conduct conversations via voice communications and textual communications. For example, the chatbot service 230 may include a machine learning component that employs classification models, natural language processing models, and/or deep learnings models to determine responses to the communication data 248 received from the inmate device 206, the inmate devices 210, and the staff devices 214.

In some instances, the chatbot service 230 dynamically generates responses to the communication data 248 received from the inmate device 210, the inmate devices 210, and the staff devices 214. In some other instances, the chatbot service 230 identifies pre-determined responses corresponding to the communication data 248 received from the inmate device 206, the inmate devices 210, and the staff devices 214. By providing the inmate 208 and the inmates 212 the opportunity to converse with the chatbot service 230, the communication system 200 allows the inmate 208 and the inmates 212 to confidentially communicate about activity within the controlled environment 202.

Additionally, in some embodiments, the chatbot service 230 identifies the proper staff member 216 to notify about the communication data 248. For example, if the chatbot service 230 determines that the communication data 248 relates to a medical emergency, the chatbot service 230 sends a notification to a staff member 216 with medical duties. In some embodiments, the notification includes at least an electronic message comprising at least a portion of the communication data 248.

As another example, if the determines that particular communication data 248 relates to misconduct by the staff member 216(3) having investigative privileges, the chatbot service 230 sends a notification to a staff member 216(4) with administrative duties. In some embodiments, the notification includes an electronic message comprising at least a portion of the particular communication data 248. Additionally, the chatbot service 230 instructs the security module 236 to prevent access by the staff member 216(3) to the stored communications 234 corresponding to the particular communication data 248 even though the staff member 216(3) has investigative privileges.

The communication service 222 manages the availability of the inmate device 206, the inmate devices 210, the staff devices 214, and/or instances of the chatbot service 230 to communicate via the communication server 204. For example, the communication service 222 may include a presence based communication service. Further, the communication service 222 establishes communication sessions 250(1)-(N) between communication clients (e.g., inmate device 206, the inmate devices 210, the staff devices 214, and/or instances of the chatbot service 230) via the communication network(s) 220.

For example, suppose the inmate 208 endeavors to communicate with the staff member 216(1) to provide information about a physical attack that occurred within the controlled environment 202. The inmate 208 can employ the inmate device 206 to transmit a communication request 252 to the communication server 204. In some embodiments, the inmate 208 uses a communication application 254 installed on the inmate device 206 to initiate communications with the staff member 216(1). For example, the communication application 254 presents a user interface to the inmate 208, the user interface including graphical components that provide a means for the inmate 208 to attempt to initiate communications with the staff member 216(1). In some embodiments, the communication application 254 presents a graphical user interface with selectable icons corresponding to the inmates 212, staff members 216, and an instance of the chatbot service 230 available to communicate via the communication system 200.

As shown in FIG. 2, the communication request 252 includes the client identifier 256 identifying the inmate 208, and the called party identifier 258 identifying the staff member 216(1). In some embodiments, the called party identifier 258 uniquely corresponds to an individual client. In some other embodiments, the called party identifier 258 corresponds to a logical group that includes one or more clients within the communication system 200. Some examples of logical groups include correctional officers, medical staff, custodial staff, administrative staff, contractors, etc. In yet still some other embodiments, the called party identifier 258 corresponds to a plurality of clients (e.g., the inmates 212, the staff members 216, and the chatbot service 230) within the communication system 200. Thus, allowing the inmate 208 to establish a multi-client communication session 250(1) (e.g., conference call, group chat, etc.). Additionally, or alternatively, the inmate 208 may add additional clients to the communication session 250(1) after it has been established.

Upon receipt of the communication request 252, the communication service 222 determines whether the inmate 208 is authorized to communicate with the staff member 216(1) via the communication system 200. In some embodiments, the communication service 222 determines whether the inmate 208 is authorized to communicate with the staff member 216(1) based on at least one of the inmate information 224 and/or the staff member information 226. For example, the security module 236 determines whether the staff member 216(1) is permitted to communicate with the inmate 208 based on an access control list (e.g., blacklist, whitelist, etc.) included in the staff member profile 244(1) and/or the inmate profile 242(1). As another example, the security module 236 determines whether the staff member 216(1) is permitted to communicate with the inmate 208 based on an employee role and/or job title information of the first staff member as indicated in the staff member profile 244(1).

When the inmate 208(1) is authorized to communicate with the staff member 216(1), the communication service 222 establishes the communication session 250(1) between the inmate device 206 and the staff device 214(1). Further, in some embodiments, the communication sessions 250 are between two communication devices (e.g., the inmate device 206, the inmate devices 210, the staff devices 214, the communication server 204, etc). In some other embodiments, the communication sessions 250 are between more than two communication devices. Further, the communication sessions 250 may include at least one of a video call, telephone call, or text based communication.

As the inmate device 206 and the staff device 214(1) send the communication data 248 via the communication session 250(1), the communication service 222 stores the communication data 248 as the stored communication 234(1). Further, the communication service 222 manages and audits access to the stored communication 234(1). For example, the communication service 222 controls reading, writing, editing, deletion of the stored communication 234(1) based on authorization information included in the staff member information 226. Additionally, the communication service 222 records attempts by the staff members 216 and staff devices 214 to access the stored communication 234(1).

In some embodiments, the communication service 222 determines that the communication data 248 is confidential based on at least one of the inmate information 224 or staff member information 226. For example, the staff member profile 244(1) may indicate that the staff member 216(1) has investigative privileges within the controlled environment 202. As such, the staff member 216(1) may need to conduct confidential communications with the inmate 208, the inmates 212, and/or the staff members 216 within the controlled environment 202. When the communication service 222 determines the communication data 248 over the communication session 250(1) is confidential, the communication services 222 stores the communication data 248 as confidential stored communications 262(1). Additionally, the communication service 222 sends a confidential notification 264 to the inmate device 206 and/or the staff device 214(1). Upon receipt of the confidential notification 264, the communication application 254 indicates to the inmate 208 that the communication session 250(1) is confidential. In some embodiments, the inmate device 206 provides a visual or audible alert to the inmate 208 via the I/O devices 266 of the inmate device 206.

Further, the communication service 222 stores information indicating that the confidential stored communications 262 are confidential. In some embodiments, the communication service 222 creates metadata indicating that the confidential stored communications 262 pertaining to the communication data 248 are confidential. Additionally, or alternatively, the communication service 222 generates database information indicating that the confidential stored communications 262 pertaining to the communication data 248 are confidential.

In some embodiments, the communication service 222 restricts access to the confidential stored communications 262. For example, the communication service 222 restricts access to the confidential stored communications 262 to staff members 216 with investigative privileges. As another example, the communication service 222 denies request to delete the confidential stored communications 262. For instance, the communication service 222 may deny a request to delete a particular communication of the confidential stored communications 262 based upon the age of the particular communication of the confidential stored communications 262. In some embodiments, the communication service 222 denies a request to delete the one of the privilege stored communications 262 is the difference between the creation date of the confidential stored communication 262 and the current date is less than a predetermined threshold.

In some other instances, the communication service 222 may deny a request to edit or delete a particular confidential stored communication 262 when the particular confidential stored communication 262 pertains to an open investigation within the controlled environment 202. In yet still some other instances, the communication service 222 may deny a request to edit or delete a particular confidential stored communication 262 when the particular confidential stored communication 262 pertains to potential misconduct by the staff members 216 within the controlled environment 202.

The communication analysis module 232 determines one or more subjects of the communication sessions 250 for monitoring purposes. In some embodiments, the communication analysis module 232 employs keyword monitoring to determine the subject of the communication sessions 250. For example, the communication analysis module 232 may monitor the communication data for identifiers (e.g., names, nicknames, attributes, etc.) of individual staff members 216 within the controlled environment 202. Additionally, or alternatively, the communication analysis module 232 employs classification models, natural language processing, and other machine learning techniques to determine the subject of the communication sessions 250. In some instances, the communication analysis module 232 determines that the communication sessions 250 are confidential based on the subjects identified within the communication data 248. For example, the communication analysis module 232 is trained to detect that the communication session 250(1) pertains to potential misconduct by the staff members 216 and/or inmates 212.

In some embodiments, the communication analysis module 232 determines that the communication data 248 pertains to the staff members 216(2)-216(N) smuggling contraband into the controlled environment 202. In some other embodiments, the communication analysis module 232 determines that the communication data 248 pertains to a planned attack by the inmates 212. In yet still some other embodiments, the communication analysis module 232 determines that the communication data 248 pertains to an attack witnessed by the inmate 208 within the controlled environment 202.

Once the communication analysis module 232 determines that subject matter of the communication session 250(1) pertains to confidential subject matter, the communication analysis module 232 instructs the communication service 222 to store the communication data 248 as the confidential stored communication 262(1). Further, the communication analysis module 232 can instruct the communication service 222 to the restrict access to the confidential stored communication 262(1) to one or more staff members 216 associated with the misconduct discussed in the communication session 250(1). For example, if the communication data 248 pertain to potential misconduct by the staff member 216(2), the communication service 222 updates the staff member profile 244(2) to indicate that the staff member 216(2) should not permitted to access the confidential stored communication 262(1) corresponding to the communication data 248 even if the staff member 216(2) has investigative privileges or administrative privileges.

Additionally, or alternatively, the inmate 208 or the staff member 216(1) can request that the communication service 222 store the communications over the communication session 250(1) as the confidential stored communications 262. For example, the communication application 254 can a present a graphical user interface with a control for requesting that the communication service process communications over the communication session 250(1) as confidential. Further, when the inmate 208 selects the control, the communication request 252 can include an indication that the communication session 250(1) should be processed as confidential by the communication service 222.

In some embodiments, the communication analysis module 232 is further trained to detect that the communication data 248 pertain to a medical emergency within the controlled environment 202. For example, the communication analysis module 232 determines that the communication data 248 includes at least one of an identifier of a medical illness, or a description of one or more symptoms corresponding to a medical illness. Further, the communication analysis module 232 instructs the communication service 222 to send the communication data 248 to a staff member 216 with medical duties.

The security module 236 performs authentication and authorization of the clients (e.g., the inmate 208, the inmates 212, and the staff members 216), and/or the client devices (e.g., the inmate device 206, the inmate devices 210, and the staff devices 214) of the communication service 222. Furthermore, in certain embodiments, the security module 236 performs encryption and decryption of data transmitted within the communication system 200. In addition, the security module 236 manages authentication information and authorization information for performing authentication and authorization of the clients and client devices. Some examples of authentication information include authentication credentials, user identifiers, device identifiers, passwords, certificates, cookies, tokens, etc. Some examples of authorization information include access control lists (ACLs), client capabilities, client device capabilities, security policy information, etc.

Further, the security module 236 manages the secure storage of the stored communications 234. In some embodiments, the security module encrypts and decrypts the stored communications 234. Further, the security module 236 controls access to the stored communications 234 based on at least one of the inmate information 224, and the staff member information 226, and the device information 226. For example, the staff member 216(1) may request access to the stored communications 234(1). As a result, the security module 236 determines whether the staff member 216(1) is permitted to access the stored communications 234(1) based on an access control list included in the staff member profile 244(1). If the security module 236 determines that the staff member 216(1) is permitted to access the stored communications 234(1), the security module 236 may ensure that the staff device 214(1) is provided access to an unencrypted version of the stored communications 234(1). Additionally, the security module 236 monitors and audits attempts to access the stored communications 234. In some embodiments, the security module logs attempts to access the stored communications 234 by the inmate device 206, the inmate devices 210, and/or the staff devices 214.

The search module 238 provides, to the inmates 212 and/or the staff members 216, the ability to search the stored communications 234. In some embodiments, the staff devices 214 send search queries 268(1)-(N) to the search module 238. For example, suppose the staff member 216(1) endeavors to view stored communications 234 related to the staff member 216(2). The staff member 216(1) employs the staff device 214(1) to send the search query 268(1) to the search module 238. As shown in FIG. 2, the search query 268(1) includes a client identifier 269 of the staff member 216(1), and search terms 270 (i.e., an identifier of the staff member 216(2)). In some examples, the search terms 270 includes at least one of identifiers of participants associated with a stored communication 234, one or more terms used in a stored communication 234, one or more subjects associated with the stored communications 234, a date and/or time range associated with the stored communications 234, one or more categories associated with the stored communications 234, and/or one or more descriptive tags associated with the stored communications 234.

Upon receipt of the search query 268(1), the search module 238 determines search results that include stored communications 234 wherein the staff member 216(1) was a participant and stored communications 234 wherein the staff member 216(1) was a subject. Further, the security module 236 determines modified search results 272 based upon the client identifier 269 and/or metadata corresponding to the search results. For example, the security module 236 determines the modified search results 272 by filtering stored communications 234 from the search results that the staff member 216(1) is not authorized to access based upon the staff member profile 244(1) associated with the client identifier 269. Once the security module 236 determines the modified search results 272, the search module 238 sends the modified search results 272 to the staff device 214(1).

The tracking module 240 monitors the location of the clients (e.g., the inmate 208, the inmates 212, and the staff members 216) and client devices (e.g., the inmate device 206, the inmate devices 210, and the staff devices 214) within the controlled environment 202. As illustrated in FIG. 2, the tracking module 240 receives the location information 274 from the sensors and controllers 218 and/or the client devices (e.g., inmate device 206, the inmate devices 210, and the staff devices 214). For example, the sensor and controller 218(1) sends the first location information 274(1) to the communication server 204. Further, the first location information 274(1) includes a source device identifier 276(1) that identifies the sensor and controller 218(1) that sends the first location information 274(1), and a location identifier 278 of the sensor and controller 218(1). As used herein, a location identifier includes a name, a coordinate, positional descriptor, or any information capable of identifying a location of a device within the controlled environment 202.

In some embodiments, the first location information 274(1) further includes proximal device identifiers 280(1) that identify inmate devices 210 and staff devices 214 within a predetermined proximity of the source device (i.e., the sensor and controller 218(1)). For example, the first location information 274(1) includes the proximal device identifiers 280(1) corresponding to the inmate device 206 and staff device 214(1), respectively. In some embodiments, the sensors and controllers 218 periodically detect the inmate devices 210 and staff devices 214 within a predetermined proximity of the sensors and controllers 218, and send the location information 274 including proximal device identifiers 280(1) corresponding to the detected inmate devices 210 and staff devices 214.

Upon receipt of the location information 274 from the sensors and controllers 218 and/or the client devices (e.g., the inmate device 206, inmate devices 210 and staff devices 214), the tracking module 240 determines the locations of the client devices and associated clients (e.g., the inmate 208, the inmates 212, and the staff members 216). Further, the tracking module 240 updates the inmate information 224, inmate device information 228, and staff member information 226 to reflect the determined locations of the clients and the client devices. For example, if the tracking module 240 receives the location information 274(1), the tracking module 240 updates the first inmate profile 242 (1) is associated with the inmate 208 to indicate that the inmate 208 is located within an area of the controlled environment 202 identified by the location identifier 278(1).

In some embodiments, the tracking module 240 determines whether the privacy afforded a client during a communication session 250 will be compromised by movement of the inmate 208, the inmates 212, and/or the staff members 216 within the controlled environment 202. For example, if the inmate 208 is communicating with the staff member 216(1) via the communication application 254 and the tracking module 240 determines that one or more inmates 212 are moving within a predetermined proximity of the inmate device 206, the tracking module 240 sends the incognito notification 282 to the inmate device 206. Upon receipt of the incognito notification 282, the communication application 254 indicates to the inmate 208 that another person will be within a predetermined proximity of the inmate 208. For instance, the communication application 254 provides a visual or audible alert to the inmate 208 via the I/O devices 266 of the inmate device 206.

In some embodiments, the communication application 254 pauses the communication session 250(1) and/or masks evidence of the communication session 250(1) based upon receipt of the incognito notification 282. For example, the communication application 254 enters an incognito mode as described in further detail with respect to FIG. 3E. Additionally or alternatively, the communication application 254 enters the incognito mode based at least in part on a gesture movement performed with respect to the inmate device 206. For example, the sensors 284 of the inmate device 206 may detect that the inmate 208 has moved the inmate device 206 in accordance with a predetermined gesture pattern defined by an orientation, speed of movement, and/or position of the inmate device 206. As another example, the inmate 208 may input a gesture (e.g., swipe, pinch, etc.) to the I/O devices 266 of the inmate device 206.

In addition, the tracking module 240 generates a graphical user interface including that illustrates at least the locations of the clients (e.g., the inmate 208, the inmates 212, and the staff members 216) and client devices (e.g., the inmate device 206, the inmate devices 210, and the staff devices 214) within the controlled environment 202.

FIGS. 3A-3F illustrate example graphical user interfaces for providing communication system in a controlled environment, according to exemplary embodiments.

FIG. 3A illustrates an example graphical user interface 300 displayed on an inmate device operating in a normal mode during a video call. As shown in FIG. 3A, the graphical user interface 300 includes a participant identifier 302 that identifies a participant in an active communication session (e.g., the communication session 250(1)). Further, the graphical user interface 300 includes a communication interface 304 that includes visual interface for the video call, and a call duration status 306 indicating the temporal duration of the communication session. As further shown in FIG. 3A, the graphical user interface 300 includes a mute control 308 that mutes the communication session, and an end control 310 that ends the communication session.

FIG. 3B illustrates an example graphical user interface 312 displayed on an inmate device operating in a confidential mode during a video call. In some embodiments, the example graphical user interface 312 is displayed in response to receipt of a confidential notification (e.g., the confidential notification 264). As shown in FIG. 3B, the graphical user interface 312 includes a participant identifier 314 that identifies a participant in an active communication session (e.g., the communication session 250(1)). Further, the graphical user interface 312 includes a communication interface 316 that includes visual interface for the video call, and a call duration status 318 indicating the temporal duration of the communication session. As further shown in FIG. 3B, the graphical user interface 300 includes a mute control 320 that mutes the communication session, an end control 322 that ends the communication session, and the confidential status indicators 324(1) and 324(2).

The confidential status indicators 324(1) and 324(2) provide visual indication to a user that the current communication session is confidential. More specifically, the confidential status indicator 324(1) includes text explicitly communicating that the communication session is confidential. Further, the confidential status indicator 324(2) includes visual modifications to the graphical components presented in the normal mode. For instance, the confidential status indicator 324(2) includes a visual modification to the communication interface 316 when compared to communication interface 304 of the normal mode. Some examples of visual modifications include changes to the size, shapes, colors, background graphics, layout, font, and/or typeface of graphical elements presented within the graphical user interface 300 of the normal mode.

FIG. 3C illustrates an example graphical user interface 326 displayed on an inmate device operating in a normal mode during a textual chat. As shown in FIG. 3C, the graphical user interface 326 includes a participant identifier 328 that identifies a participant in an active communication session (e.g., the communication session 250(1)). Further, the graphical user interface 326 includes a communication interface 330 that includes chat log for the textual chat, and a chat duration status 332 indicating the temporal duration of the communication session. As further shown in FIG. 3C, the graphical user interface 326 includes and an end control 334 that ends the communication session.

FIG. 3D illustrates an example graphical user interface 336 displayed on an inmate device operating in a confidential mode during a textual chat. In some embodiments, the example graphical user interface 336 is displayed in response to receipt of a confidential notification (e.g., the confidential notification 264). As shown in FIG. 3D, the graphical user interface 336 includes a participant identifier 338 that identifies a participant in an active communication session (e.g., the communication session 250(1)). Further, the graphical user interface 334 includes a communication interface 340 that includes a chat log for the textual chat, and a chat duration status 342 indicating the temporal duration of the communication session. As further shown in FIG. 3D, the graphical user interface 334 includes an end control 344 that ends the communication session, and the confidential status indicators 346(1) and 346(2).

The confidential status indicators 346(1) and 346(2) provide visual indication to a user that the current communication session is confidential. More specifically, the confidential status indicator 346(1) includes text explicitly communicating that the communication session is confidential. Further, the confidential status indicator 346(2) includes visual modifications to the graphical components presented in the normal mode. For instance, the confidential status indicator 346(2) includes a visual modification to the communication interface 340 when compared to communication interface 330 of the normal mode. Some examples of visual modifications include changes to the size, shapes, colors, background graphics, layout, font, and/or typeface of graphical elements presented within the graphical user interface 336 of the normal mode.

Figure 3E:
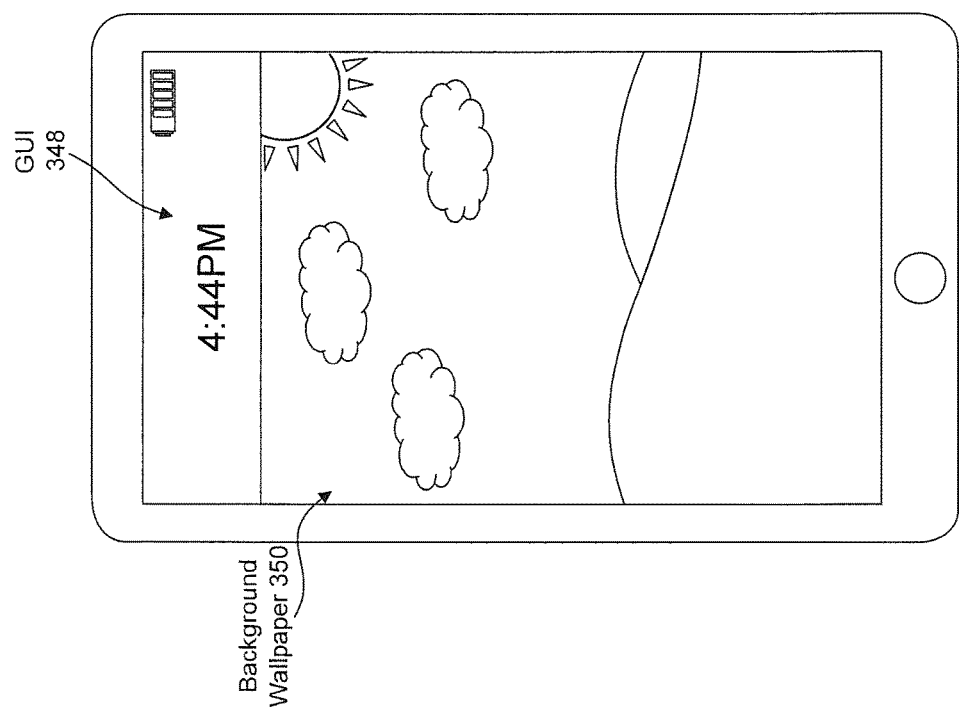

FIG. 3E illustrates an example graphical user interface 348 displayed on an inmate device operating in incognito mode. In some embodiments, the example graphical user interface 348 is displayed in response to receipt of an incognito notification (e.g., the incognito notification 282). As described in detail above, when the inmate device receives an incognito notification, a communication application (e.g., the communication application 254) will transition from one of the graphical user interfaces (graphical user interfaces 300, 312, 326, and 334) of FIG. 3A-3D to the graphical user interface 348 in order to prevent an interloper from eavesdropping on the communication session. As shown in FIG. 3E, the incognito mode causes a standard background wallpaper 350 of the inmate device to be displayed. Additionally, or alternatively, the incognito mode causes the inmate device to open up another application installed on the inmate device, and display a graphical user interface corresponding to the application.

Figure 4:
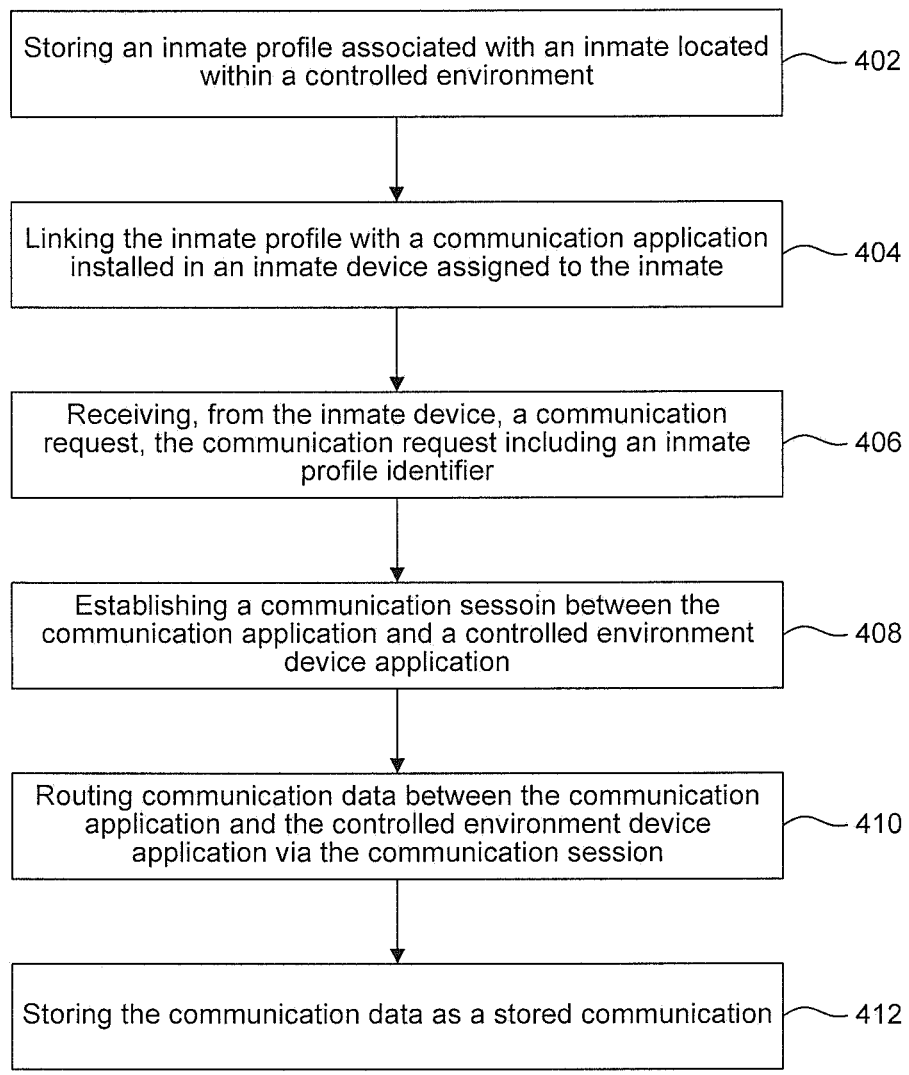
FIG. 4 is a flow diagram illustrating an example process for providing a communication system in a controlled environment, according to exemplary embodiments.

FIG. 4 illustrates a process 400 for providing a communication system in a controlled environment. The process 400 is illustrated as a collection of blocks in a logical flow graph, which represent a sequence of operations that can be implemented in hardware, software, or a combination thereof. The blocks are referenced by numbers 402-412. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations is described is not intended to be construed as a limitation, and any number of the described blocks can be combined in any order and/or in parallel to implement the process.

At 402, a controlled environment communication server stores an inmate profile associated with an inmate located within a controlled environment. For example, the communication server 204 stores the inmate information 224 that includes the inmate profile 242 (1) associated with the inmate 208.

At 404, the communication server associates the inmate profile with a communication application installed in an inmate device assigned to the inmate. For example, the communication server 204 associates the inmate profile 242(1) with the communication application 254 installed on the inmate device 206 possessed by the inmate 208. In some embodiments, the communication server 204 updates the inmate profile 242(1) to indicate that the inmate 208 is associated with the instance of the communication application 254 installed on the inmate device 206.

At 406, the controlled environment communication server receives, from the inmate device, a communication request, the communication request including an inmate profile identifier. For example, the communication service 222 receives the communication request 252 from the communication application 254 on the inmate device 206 via the communication network(s) 220. In some embodiments, the communication request 252 includes the client identifier 256 identifying the inmate 208, and the called party identifier 258 identifying the staff member 216(1).

At 408, the communication server establishes a communication session between the communication application and a controlled environment device application based on the inmate profile. For example, the communication service 222 establishes the communication session 250(1) between the communication application 254 installed on the inmate device 206 and the staff device 214(1). In some embodiments, the communication session 250(1) may include at least one of a Voice over Internet Protocol (VoIP) session, real-time transport protocol (RTP) session, extensible messaging and presence protocol (XMPP) session over the communication network(s) 220.

In some embodiments, the communication service 222 establishes the communication session 250(1) based at least in part on the inmate information 224 and/or the staff member information 226. For example, the communication service 222 determines whether the inmate 208 is permitted to communicate with the staff member 216(1) via the communication system 200 based on the inmate profiles 242 and/or the staff member profiles 244. In some instances, the inmate profile 242(1) indicates that the inmate 208 is not permitted to communicate with the staff member 216(1). In some other instances, the staff member profile 244(1) indicates that the staff member 216(1) is not currently available to communicate with the inmate 208.

At 410, the communication server routes communication data between the communication application and the controlled environment device application via the communication session. For example, the communication service 222 acts as a relay interface, and routes the communication data 248 between the communication application 254 on the inmate device 206 and a controlled environment device application installed on the staff device 214(1), via the communication session 250(1).

At 412, the communication server stores the communication session as a stored communication. For example, the communication service 222 stores the communication data 248 to the communication server 204 as the stored communications 234. Thereby providing the ability to monitor and review communications between clients (e.g., the inmate 208, the inmates 212, and the staff members 216) within the controlled environment 202 via the communication system 200.

In some embodiments, the communication application 254 stores a log of the communication data 248 during the communication session 250(1). Further, the communication application 254 sends the log of the communication session 250(1) to the communication service 222. Upon receipt of the log of the communication data 248, the communication service 222 stores the log of the communication data 248 as the stored communications 234.

Figure 5:
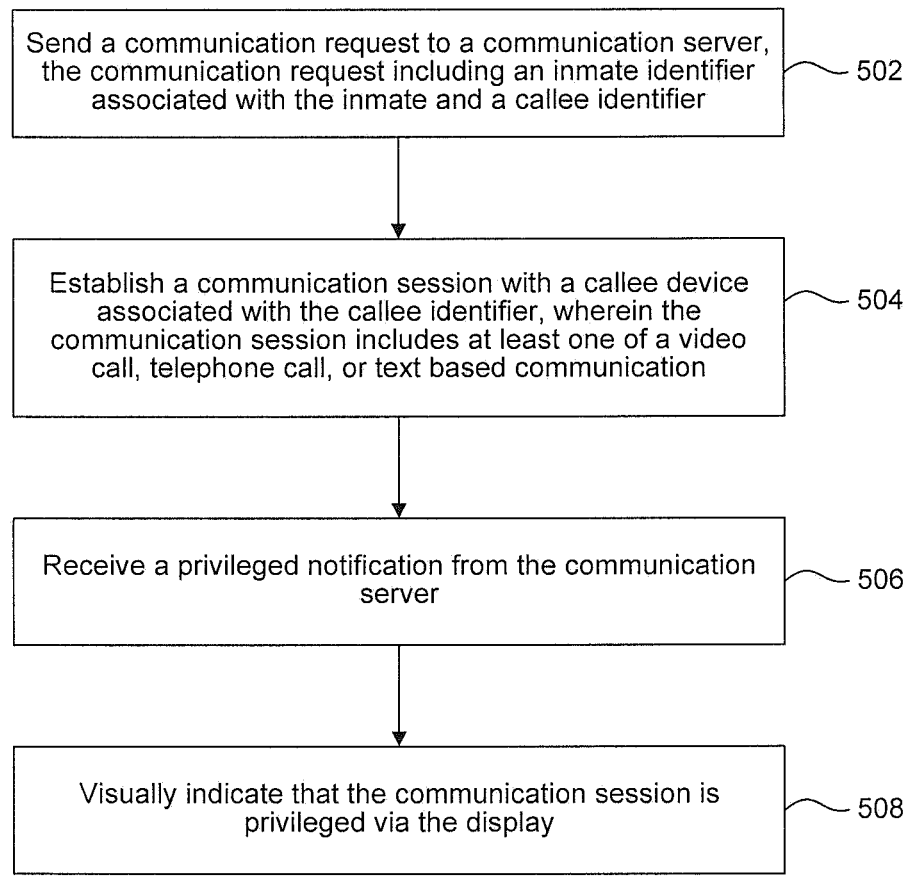
FIG. 5 is a flow diagram illustrating an example process for providing a communication system in a controlled environment, according to exemplary embodiments.

FIG. 5 illustrates a process 500 for providing a communication system in a controlled environment, according to some implementations. The process 500 is illustrated as a collection of blocks in a logical flow graph, which represent a sequence of operations that can be implemented in hardware, software, or a combination thereof. The blocks are referenced by numbers 502-508. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations is described is not intended to be construed as a limitation, and any number of the described blocks can be combined in any order and/or in parallel to implement the process.

At 502, an inmate device sends a communication request to a communication server, the communication request including an inmate identifier associated with the inmate and a called party identifier. For example, the inmate device 206 sends the communication request 252 to the controlled environment communication server 204. Further, the communication request 252 includes the client identifier 256 identifying the inmate 208, and the called party identifier 258 identifying the staff member 216(1).

At 504, the inmate device establishes a communication session with a called party device associated with the called party identifier, wherein the communication session includes at least one of a video call, telephone call, or text based communication. For example, the inmate device 206 establishes the communication session 250(1) with the staff device 214(1).

In some embodiments, the communication session 250(1) may include at least one of a Voice over Internet Protocol (VoIP) session, real-time transport protocol (RTP) session, extensible messaging and presence protocol (XMPP) session over the communication network(s) 220. Further, in certain embodiments, the communication server 204 routes the communication data 248 between the communication application 254 installed on the inmate device 206 and the staff device 214(1), via the communication session 250(1).

At 506, the inmate device receives a confidential notification from the communication server. For example, if the communication service 222, chatbot service 230, and/or the communication analysis module 232 determine that the communication data 248 is confidential, the communication server 204 sends the confidential notification 264 to the inmate device 206 and the staff device 214(1).

In some embodiments, the communication service 222 determines that the communication data 248 are confidential based on at least one of the inmate information 224 or staff member information 226. For example, the staff member profile 244(1) may indicate that the staff member 216(1) has investigative privileges within the controlled environment 202. As such, the staff member 216(1) may need to conduct confidential communications with the inmate 208, the inmates 212, and/or the staff members within the controlled environment 202. Additionally, or alternatively, the chatbot service 230 and communication analysis module 232 may determine that the communication data 248 is confidential based on performing machine learning techniques to identify one or more subjects associated with the communication data.

At 508, the inmate device visually indicates that the communication session is confidential via the display. For example, provides, to the inmate 208, a visual and/or audible alert that the communication session 250(1) is confidential via the I/O devices 266.

Figure 6:
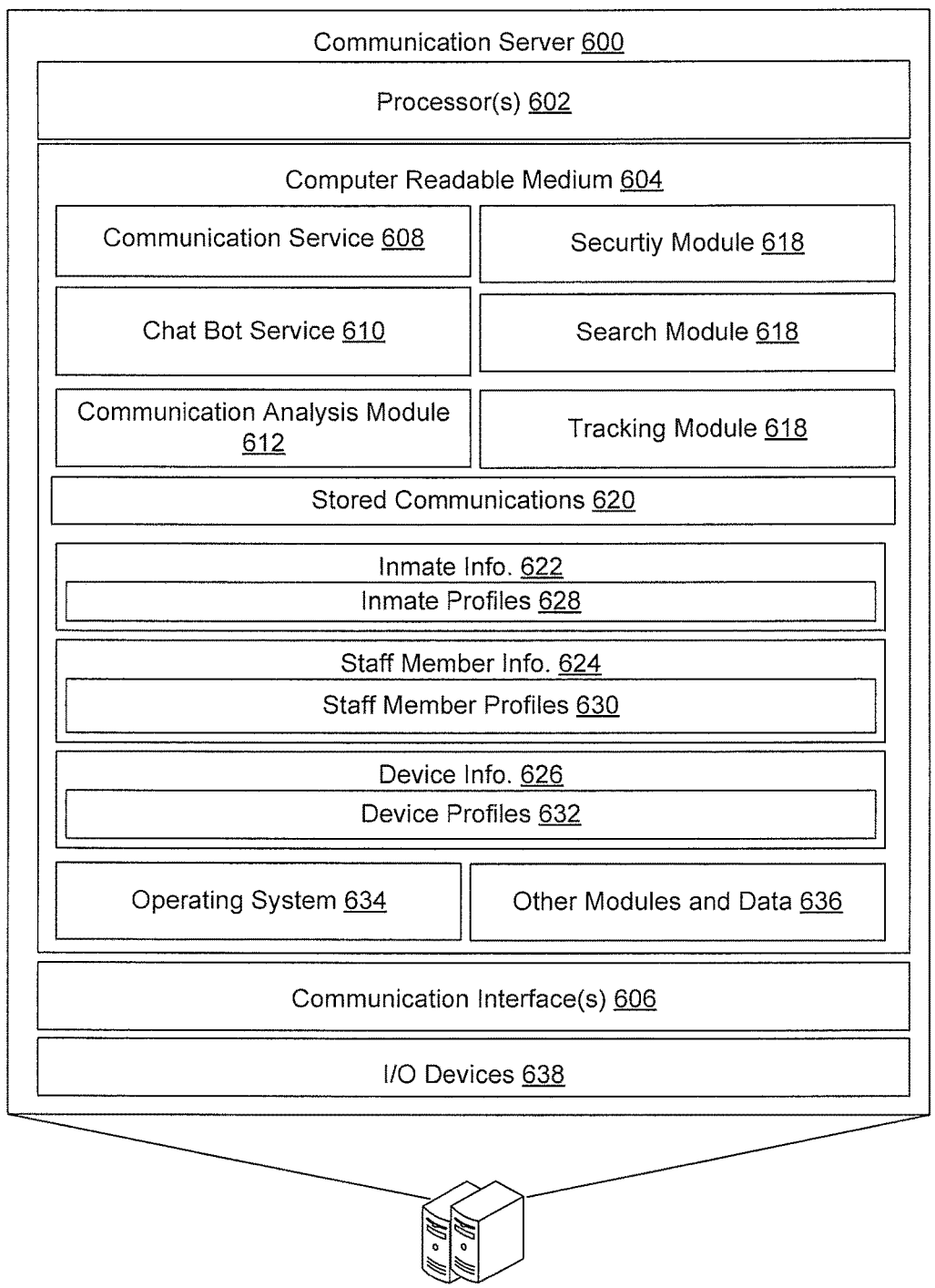
FIG. 6 illustrates a block diagram of select components of an example communication server, according to exemplary embodiments.

FIG. 6 illustrates select components of the communication server 600 (e.g., the controlled environment communication server 104 and the communication server 204) that implements the functionality described above, according to an exemplary embodiment. The communication server 600 includes one or more servers or other types of computing devices that may be embodied in any number of ways. For instance, the modules, other functional components, and data may be implemented on a single server, a cluster of servers, a server farm or data center, a cloud-hosted computing service, and so forth, although other computer architectures may additionally or alternatively be used.

Further, while the figures illustrate the components and data of the communication server 600 as being present in a single location, these components and data may alternatively be distributed across different computing devices and different locations in any manner. Consequently, the functions may be implemented by one or more computing devices, with the various functionality described above distributed in various ways across the different computing devices. Multiple communication servers 600 may be located together or separately, and organized, for example, as virtual servers, server banks and/or server farms. The described functionality may be provided by the servers of a single entity or enterprise, or may be provided by the servers and/or services of multiple different entities or enterprises.

In the illustrated example, the communication server 600 includes one or more processors 602, one or more computer-readable media 604, and one or more communication interfaces 606. Each processor 602 is a single processing unit or a number of processing units, and may include single or multiple computing units or multiple processing cores. The processor(s) 602 can be implemented as one or more microprocessors, microcomputers, microcontrollers, digital signal processors, central processing units, state machines, logic circuitries, and/or any devices that manipulate signals based on operational instructions. For instance, the processor(s) 602 may be one or more hardware processors and/or logic circuits of any suitable type specifically programmed or configured to execute the algorithms and processes described herein. The processor(s) 602 can be configured to fetch and execute computer-readable instructions stored in the computer-readable media 604, which can program the processor(s) 602 to perform the functions described herein.

The computer-readable media 604 include volatile and nonvolatile memory and/or removable and non-removable media implemented in any type of technology for storage of information, such as computer-readable instructions, data structures, program modules, or other data. Such computer-readable media 604 include, but are not limited to, RAM, ROM, EEPROM, flash memory or other memory technology, optical storage, solid state storage, magnetic tape, magnetic disk storage, network attached storage, storage area networks, cloud storage, or any other medium that can be used to store the desired information and that can be accessed by a computing device. Depending on the configuration of the communication server 600, the computer-readable media 604 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 604 is used to store any number of functional components that are executable by the processors 602. In many implementations, these functional components comprise instructions or programs that are executable by the processors and that, when executed, specifically configure the one or more processors 602 to perform the actions attributed above to the communication server 600. In addition, the computer-readable media 604 store data used for performing the operations described herein.

In the illustrated example, the functional components stored in the computer-readable media 604 include a communication service 608, a chatbot service 610, a communication analysis module 612, a security module 614, a search module 616, and a tracking module 618. Further, the computer-readable media 604 include stored communications 620, inmate information 622, staff member information 624, and device information 626. In addition, the inmate information 622 includes inmate profiles 628, the staff member information 624, includes staff member profiles 630, and the device information 626 includes device profiles 632.

Additional functional components stored in the computer-readable media 604 include an operating system 634 for controlling and managing various functions of the communication server 600. The communication server 600 also include or maintain other functional components and data, such as other modules and data 636, which include programs, drivers, etc., and the data used or generated by the functional components. Further, the communication server 600 includes many other logical, programmatic and physical components, of which those described above are merely examples that are related to the discussion herein.

The communication interface(s) 606 include one or more interfaces and hardware components for enabling communication with various other devices, such as the client devices, or other computing devices, over the network(s) 110 and 220. For example, communication interface(s) 606 facilitate communication through one or more of the Internet, cable networks, cellular networks, wireless networks (e.g., Wi-Fi, cellular) and wired networks. As several examples, the communication server 600 and the inmate device 206 communicate and interact with one another using any combination of suitable communication and networking protocols, such as Internet protocol (IP), transmission control protocol (TCP), hypertext transfer protocol (HTTP), cellular or radio communication protocols, and so forth. Examples of communication interface(s) include a modem, a network interface (such as an Ethernet card), a communications port, a PCMCIA slot and card, etc.

The communication server 600 may further be equipped with various input/output (I/O) devices 638. Such I/O devices include a display, various user interface controls (e.g., buttons, joystick, keyboard, mouse, touch screen, etc.), audio speakers, connection ports and so forth.

Figure 7:
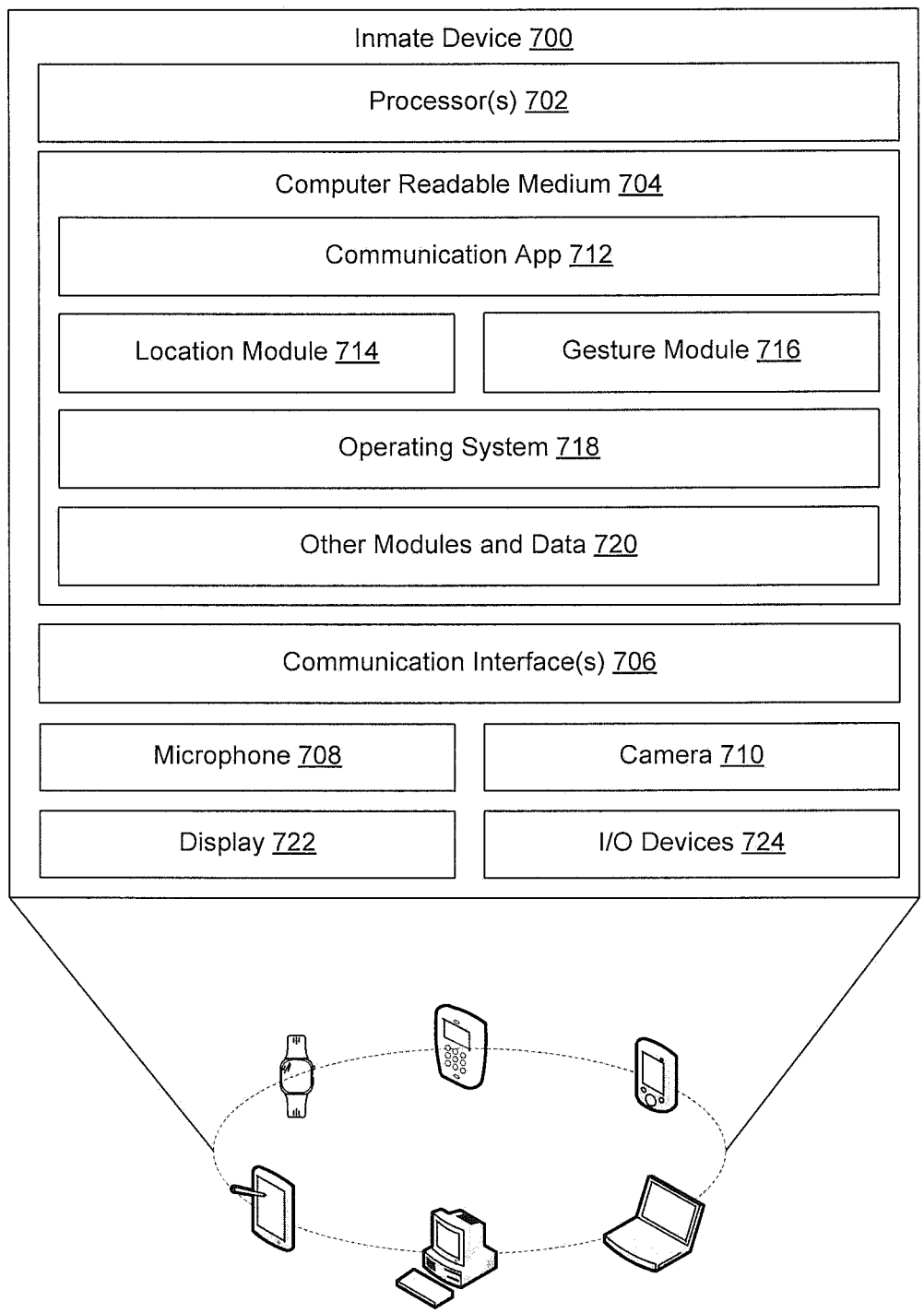
FIG. 7 illustrates a block diagram of select components of an example inmate device, according to exemplary embodiments.

FIG. 7 illustrates select example components of the inmate device 700 (e.g., the inmate device 106, the inmate device 206, the inmate devices 210, and the staff devices 214) that implements the functionality described above, according to an exemplary embodiment. The inmate device 700 may be any of a number of different types of personal computing devices. Some examples of the inmate device 700 include smart phones and mobile communication devices, tablet computing devices, desktops, laptops, netbooks and other portable computers, wearable computing devices, and any other portable device capable of sending communications and performing the functions according to the techniques described herein.

In the illustrated example, the inmate device 700 includes one or more processors 702, one or more computer-readable media 704, one or more communication interfaces 706, a microphone 708, and a camera 710. Each processor 702 is a single processing unit or a number of processing units, and may include single or multiple computing units or multiple processing cores. The processor(s) 702 can be implemented as one or more microprocessors, microcomputers, microcontrollers, digital signal processors, central processing units, state machines, logic circuitries, and/or any devices that manipulate signals based on operational instructions. For instance, the processor(s) 702 may be one or more hardware processors and/or logic circuits of any suitable type specifically programmed or configured to execute the algorithms and processes described herein. The processor(s) 702 can be configured to fetch and execute computer-readable instructions stored in the computer-readable media 704, which can program the processor(s) 702 to perform the functions described herein.

The computer-readable media 704 include volatile and nonvolatile memory and/or removable and non-removable media implemented in any type of technology for storage of information, such as computer-readable instructions, data structures, program modules, or other data. Such computer-readable media 704 include, but are not limited to, RAM, ROM, EEPROM, flash memory or other memory technology, optical storage, solid state storage, magnetic tape, magnetic disk storage, network attached storage, storage area networks, cloud storage, or any other medium that can be used to store the desired information and that can be accessed by a computing device. Depending on the configuration of the inmate device 700, the computer-readable media 704 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 704 is used to store any number of functional components that are executable by the processors 702. In many implementations, these functional components comprise instructions or programs that are executable by the processors and that, when executed, specifically configure the one or more processors 702 to perform the actions attributed above to the inmate devices (e.g., the inmate device 106, the inmate device 206, the inmate devices 210, and the staff devices 214). In addition, the computer-readable media 704 store data used for performing the operations described herein.

In the illustrated example, the functional components stored in the computer-readable media 704 include a communication application 712, a location module 714, and a gesture module 716. As described in detail above, the communication application 712 presents a graphical user interface for sending communication requests (e.g., the communication request 116 and the communication request 252), sending and receiving communication data 124, 126, and 248, receiving confidential notifications (e.g., the confidential notification 264) and incognito notifications (e.g., and the incognito notification 282) from a communication server (e.g., the communication servers 104, 204, and 600), indicating that a communication session (e.g., the communication session 122 and the communication sessions 250) is confidential in response to receiving a confidential notification, and entering an incognito mode in response to receiving an incognito notification. In some embodiments, the incognito mode of the communication application 712 includes entering a background application state that masks that the communication application 712 is being executed on the inmate device 700.

In some embodiments, the location module 714 manages the transmission of location information (e.g., the location information 274) to the communication servers 104, 204, and 600. Further, the location module 714 determines a location identifier (e.g., the location identifier 278) of the inmate device 700. In some embodiments, the location module 714 includes a global positioning system (GPS), an indoor positioning system (IPS) device, or a global'naya navigatsionnaya sputnikovaya sistema (GLONASS) device. Further, the gesture module 716 is configured to detect gesture input to the inmate device 700. If the gesture module 716 detects a particular gesture input associated with the incognito mode, the gesture module 716 instructs the communication application 712 to enter the incognito mode.

Additional functional components stored in the computer-readable media 704 include an operating system 718 for controlling and managing various functions of the inmate device 700. The inmate device 700 also includes or maintains other functional components and data, such as other modules and data 720, which include programs, drivers, etc., and the data used or generated by the functional components. Further, the inmate device 700 includes many other logical, programmatic and physical components, of which those described above are merely examples that are related to the discussion herein.

The communication interface(s) 706 includes one or more interfaces and hardware components for enabling communication with various other devices, such as the controlled environment communication server 104, the communication server 204, the communication server 600, or other computing devices, over the network(s) 110 and 220. For example, communication interface(s) 706 facilitates communication through one or more of the Internet, cable networks, cellular networks, wireless networks (e.g., Wi-Fi, cellular) and wired networks. As several examples, the communication server 600 and the inmate device 700 communicate and interact with one another using any combination of suitable communication and networking protocols, such as Internet protocol (IP), transmission control protocol (TCP), hypertext transfer protocol (HTTP), cellular or radio communication protocols, and so forth. Examples of communication interface(s) include a modem, a network interface (such as an Ethernet card), a communications port, a PCMCIA slot and card, etc.

FIG. 7 further illustrates that the inmate device 700 includes a display 722. Depending on the type of computing device used as the inmate device 700, the display 722 may employ any suitable display technology. For example, the display 722 may be a liquid crystal display, a light emitting diode display, or any other suitable type of display able to present digital content thereon. In some embodiments, the display 722 includes touch sensor with the display 722 to provide a touchscreen display configured to receive touch inputs for enabling interaction with a graphic interface presented on the display 722. Accordingly, implementations herein are not limited to any particular display technology. Alternatively, in some other embodiments, the inmate device 700 may not include a display 722.

Furthermore, the inmate device 700 is equipped with various input/output (I/O) devices 724. Such I/O devices 724 include a display, various user interface controls (e.g., buttons, joystick, keyboard, mouse, touch screen, etc.), audio speakers, connection ports, sensors (e.g., accelerometer, gyroscope, a compass, localization sensors, photometer, magnetometer, fingerprint sensors, etc.), and so forth. Additionally, the inmate device 700 includes various other components that are not shown, examples of which include removable storage, a power source, such as a battery and power control unit, and so forth.

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 8:
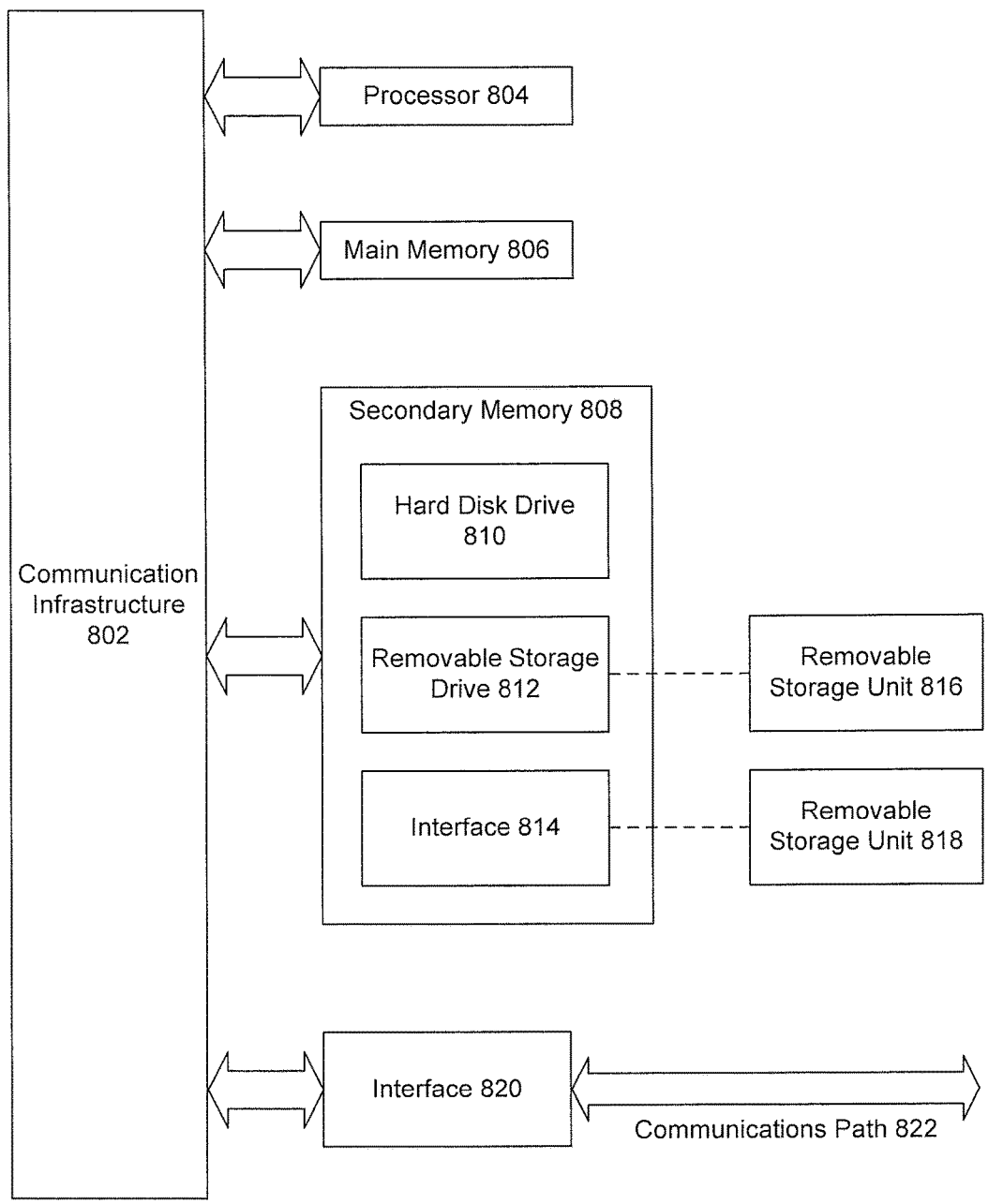
FIG. 8 illustrates a block diagram of a general purpose computer that may be used to perform various aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of FIGS. 4-5 can be implemented in the environment of one or more computer systems or other processing systems. An example of such a computer system 800 is shown in FIG. 8. One or more of the modules depicted in the previous figures can be at least partially implemented on one or more distinct computer systems 800.

Computer system 800 includes one or more processors, such as processor 804. Processor 804 can be a special purpose or a general purpose digital signal processor. Processor 804 is connected to a communication infrastructure 802 (for example, a bus or network). Various software implementations are described in terms of this exemplary computer system. After reading this description, it will become apparent to a person skilled in the relevant art(s) how to implement the disclosure using other computer systems and/or computer architectures.

Computer system 800 also includes a main memory 806, preferably random access memory (RAM), and may also include a secondary memory 808. Secondary memory 808 may include, for example, a hard disk drive 810 and/or a removable storage drive 812, representing a floppy disk drive, a magnetic tape drive, an optical disk drive, or the like. Removable storage drive 812 reads from and/or writes to a removable storage unit 916 in a well-known manner. Removable storage unit 816 represents a floppy disk, magnetic tape, optical disk, or the like, which is read by and written to by removable storage drive 812. As will be appreciated by persons skilled in the relevant art(s), removable storage unit 816 includes a computer usable storage medium having stored therein computer software and/or data.

In alternative implementations, secondary memory 808 may include other similar means for allowing computer programs or other instructions to be loaded into computer system 800. Such means may include, for example, a removable storage unit 818 and an interface 814. Examples of such means may include a program cartridge and cartridge interface (such as that found in video game devices), a removable memory chip (such as an EPROM, or PROM) and associated socket, a thumb drive and USB port, and other removable storage units 818 and interfaces 814 which allow software and data to be transferred from removable storage unit 818 to computer system 800.

Computer system 800 may also include a communications interface 820. Communications interface 820 allows software and data to be transferred between computer system 800 and external devices. Examples of communications interface 820 may include a modem, a network interface (such as an Ethernet card), a communications port, a PCM-CIA slot and card, etc. Software and data transferred via communications interface 820 are in the form of signals which may be electronic, electromagnetic, optical, or other signals capable of being received by communications interface 820. These signals are provided to communications interface 820 via a communications path 822. Communications path 822 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 816 and 818 or a hard disk installed in hard disk drive 810. These computer program products are means for providing software to computer system 800.

Computer programs (also called computer control logic) are stored in main memory 806 and/or secondary memory 808. Computer programs may also be received via communications interface 820. Such computer programs, when executed, enable the computer system 800 to implement the present disclosure as discussed herein. In particular, the computer programs, when executed, enable processor 804 to implement the processes of the present disclosure, such as any of the methods described herein. Accordingly, such computer programs represent controllers of the computer system 800. Where the disclosure is implemented using software, the software may be stored in a computer program product and loaded into computer system 800 using removable storage drive 812, interface 814, or communications interface 820.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A controlled environment communication server, comprising:
   a memory; and
   one or more processors and/or circuits coupled to the memory and configured to:
      store an inmate profile associated with an inmate located within a controlled environment;
      associate the inmate profile with a communication application installed in an inmate device assigned to the inmate;
      store a staff member profile associated with a staff member employed within the controlled environment;
      associate the staff member profile with a controlled environment device application installed on a staff device;
      receive, from the inmate device, a communication request, the communication request including an inmate profile identifier;
      establish a communication session between the communication application and the controlled environment device application based on the inmate profile;
      route communication data between the communication application and the controlled environment device application via the communication session;

determine the communication data is confidential based on the inmate profile and/or the staff member profile;

send a confidential notification to at least one of the inmate device and the controlled environment device application, the confidential notification instructing at least one of the inmate device and the controlled environment device application to indicate that the communication data is confidential; and store the communication data as a stored communication.

2. The controlled environment communication server of claim 1, wherein storing the communication session, comprises:

determining the communication data is confidential based on the inmate profile and/or the staff member profile; and storing the communication data as a confidential stored communication.

3. The controlled environment communication server of claim 1, wherein the one or more processors and/or circuits are further configured to:

receive location information from the inmate device;

determine a location of the inmate device based on the location information;

determine that an interloper is within a predetermined proximity of the location; and send an incognito notification to the communication application, the incognito notification instructing the communication application to enter an incognito mode.

4. The controlled environment communication server of claim 1, wherein the one or more processors and/or circuits are further configured to:

receive a request to delete the stored communication;

determine that the stored communication is confidential; and deny the request to delete the stored communication based on a difference between a creation date of the stored communication and a current date being less than a predetermined duration.

5. The controlled environment communication server of claim 1, wherein the staff device is a first staff device, the staff member profile is a first staff member profile, and the one or more processors and/or circuits are further configured to:

receive, from a second staff device, a search query associated with the inmate profile;

determine that the search query is associated with a second staff member profile that does not have investigative privileges;

determine search results based on the search query, the search results including an identifier of the stored communication;

determine that the stored communication is confidential;

determine modified search results that do not include the identifier of the stored communication; and send the modified search results to the second staff device.

6. The controlled environment communication server of claim 1, wherein the communication request includes a called party identifier associated with a called party, and the one or more processors and/or circuits are further configured to:

determine that the inmate and the called party are permitted to communicate based on the inmate profile and a called party profile associated with the called party.

7. The controlled environment communication server of claim 1, wherein the staff device is a first staff device, the staff member profile is a first staff member profile, and the one or more processors and/or circuits are further configured to send a notification to an investigative device associated with a second staff member profile having investigative privileges, the notification identifying the stored communication.

8. The controlled environment communication server of claim 1, wherein the staff member is a first staff member, and the one or more processors and/or circuits are further configured to:

determine that a second staff member within the controlled environment is a subject of the communication session; and prevent access by the second staff member to the stored communication.

9. The controlled environment communication server of claim 1, wherein the staff device is a first staff device, and the one or more processors and/or circuits are further configured to:

receive context information from the inmate device;

determine that a subject of the communication session is a medical emergency based on content of the communication session; and send a medical emergency notification to a second staff device associated with a medical practitioner.

10. A method, comprising:

storing an inmate profile associated with an inmate located within a controlled environment;

associating the inmate profile with a communication application installed in an inmate device assigned to the inmate;

receiving, from the inmate device, a communication request, the communication request including an inmate profile identifier;

establishing a communication session between the communication application and a controlled environment device application based on the inmate profile;

routing communication data between the communication application and the controlled environment device application via the communication session;

storing the communication data as a stored communication;

receiving, from a staff device, a search query associated with the inmate profile;

determining that the search query is associated with a staff member profile that does not have investigative privileges;

determining search results based on the search query, the search results including an identifier of the stored communication;

determining that the stored communication is confidential;

determining modified search results that do not include the identifier of the stored communication; and sending the modified search results to the staff device.

11. The method of claim 10, further comprising:

determining a staff member profile associated with the controlled environment device application;

determining the communication session is confidential based on the inmate profile and/or the staff member profile; and wherein storing the communication session as the stored communication comprises storing the communication data as a confidential stored communication.

12. The method of claim 10, further comprising:

receiving a request to delete the stored communication;

determining that the stored communication is confidential; and denying the request to delete the stored communication based on a difference between a creation date of the stored communication and a current date being less than a predetermined duration.

13. A method, comprising:
storing an inmate profile associated with an inmate located within a controlled environment;
associating the inmate profile with a communication application installed in an inmate device assigned to the inmate;
storing a staff member profile associated with a staff member employed within the controlled environment;
associating the staff member profile with a controlled environment device application installed on a staff device;
receive, from the inmate device, a communication request, the communication request including an inmate profile identifier;
establishing a communication session between the communication application and the controlled environment device application based on the inmate profile;
routing communication data between the communication application and the controlled environment device application via the communication session;
determining the communication data is confidential based on the inmate profile and/or the staff member profile;
sending a confidential notification to at least one of the inmate device and the controlled environment device application, the confidential notification instructing at least one of the inmate device and the controlled environment device application to indicate that the communication data is confidential; and
storing the communication data as a stored communication.

14. The method of claim 13, wherein the staff device is a first staff device, the staff member profile is a first staff member profile, and further comprising:
receive, from a second staff device, a search query associated with the inmate profile;
determine that the search query is associated with a second staff member profile that does not have investigative privileges;
determine search results based on the search query, the search results including an identifier of the stored communication;
determine that the stored communication is confidential;
determine modified search results that do not include the identifier of the stored communication; and
send the modified search results to the second staff device.

15. The method of claim 13, further comprising:
receiving location information from the inmate device;
determining a location of the inmate device based on the location information;
determining that an interloper is within a predetermined proximity of the location; and
sending an incognito notification to the communication application, the incognito notification instructing the communication application to enter an incognito mode.

16. The method of claim 13, further comprising:
receiving a request to delete the stored communication;
determining that the stored communication is confidential; and
denying the request to delete the stored communication based on a difference between a creation date of the stored communication and a current date being less than a predetermined duration.

17. The method of claim 13, wherein the staff member is a first staff member, further comprising:
determining that a second staff member within the controlled environment is a subject of the communication session; and
preventing access by the second staff member to the stored communication.

* * * * *